(12) United States Patent
Balasubramanian et al.

(10) Patent No.: US 7,698,668 B2
(45) Date of Patent: Apr. 13, 2010

(54) AUTOMATIC TRANSLATION OF SIMULINK MODELS INTO THE INPUT LANGUAGE OF A MODEL CHECKER

(75) Inventors: Meenakshi Balasubramanian, Bangalore (IN); Abhishek Bhatnagar, Uttar Pradesh (IN); Sudeepa Roy, Kolkata (IN)

(73) Assignee: Honeywell International Inc., Morristown, NJ (US)

( * ) Notice: Subject to any disclaimer, the term of this patent is extended or adjusted under 35 U.S.C. 154(b) by 359 days.

(21) Appl. No.: 11/545,134

(22) Filed: Oct. 10, 2006

(65) Prior Publication Data

US 2008/0086705 A1 Apr. 10, 2008

(51) Int. Cl.
G06F 17/50 (2006.01)
G06F 9/45 (2006.01)

(52) U.S. Cl. .......................................... 716/3; 717/136
(58) Field of Classification Search ...................... 716/3; 717/136
See application file for complete search history.

(56) References Cited

U.S. PATENT DOCUMENTS

| 6,029,002 | A  | * | 2/2000  | Afifi et al. ................... 717/131 |
| 7,003,751 | B1 | * | 2/2006  | Stroomer et al. .............. 716/11 |
| 7,340,684 | B2 | * | 3/2008  | Ramamoorthy et al. ..... 715/763 |
| 7,367,012 | B2 | * | 4/2008  | Szpak et al. ................. 717/106 |
| 7,415,685 | B2 | * | 8/2008  | Park et al. ....................... 716/5 |
| 2002/0120920 | A1 | * | 8/2002 | Jayaram et al. ............. 717/137 |
| 2004/0103405 | A1 | * | 5/2004 | Vargas ......................... 717/137 |
| 2006/0064670 | A1 | * | 3/2006 | Linebarger et al. .......... 717/106 |
| 2007/0067761 | A1 | * | 3/2007 | Ogilvie et al. .............. 717/146 |
| 2007/0157138 | A1 | * | 7/2007 | Ciolfi et al. .................... 716/4 |
| 2007/0261040 | A1 | * | 11/2007 | Ogilvie et al. .............. 717/146 |
| 2008/0066053 | A1 | * | 3/2008 | Ramamoorthy et al. ..... 717/114 |
| 2008/0189692 | A1 | * | 8/2008 | Inglis et al. ................. 717/154 |
| 2009/0007064 | A1 | * | 1/2009 | Yang et al. .................. 717/106 |

OTHER PUBLICATIONS

Whalen, M., et al., "ADGS-2100 adaptive display & guidance system window manager analysis", Nov. 30, 2005, pp. 1-33.*
Scaife, N., et al., "Defining and translating a "safe" subset of Simulink/Stateflow into Lustre", Jul. 15, 2004, http://www-verimag.imag.fr, pp. 1-44.*

* cited by examiner

*Primary Examiner*—Stacy A Whitmore
(74) *Attorney, Agent, or Firm*—Schiff Hardin LLP

(57) ABSTRACT

A translator converts an input model, such as resulting from a simulation of a design to be verified, into an output model suitable for verification by a model checker. The input model, for example, may be produced using Simulink, and the output model, for example, may be a NuSMV model.

19 Claims, 10 Drawing Sheets

AUTOMATIC TRANSLATION OF SIMULINK MODELS INTO THE INPUT LANGUAGE OF A MODEL CHECKER

TECHNICAL FIELD

The technical field of the present application relates to automated verification of design models.

BACKGROUND

Model Based Development (MBD) is a concept of software development in which models are developed as work products at every stage in the development life cycle. Models are concise and understandable abstractions that capture critical decisions pertaining to a development task. Models have semantics derived from the concepts and theories of a particular technical domain. Models supersede text and code as primary work products in Model Based Development, and most development activities are carried out by processing models with as much automation as possible.

Model Based Development is known to improve the quality of the product being developed. Formal models of design are used to prove that the product design is correct with respect to the product's functional requirements, thereby reducing defect leakage from the design. Automatic code and test case generation helps to reduce both coding errors and total development time.

It is well known that formal verification techniques like theorem proving and model checking reduce design defects by determining whether a design meets its functional requirements. The presence of formal models in Model Based Development permits analysis of a design using formal verification. Both Model Based Development and formal verification put emphasis on detecting design errors (high leakage rate) rather than implementation errors (low leakage rate).

The DO-178B standard produced by Radio Technical Commission for Aeronautics, Inc. defines guidelines for the development of avionics software and is the accepted means of certifying all new avionics software. However, the DO-178B standard is obsolete with respect to the Model Based Development process, but recognizes formal methods as a way to prevent and eliminate requirements errors, design errors, and code errors throughout the development life cycle. The need for formal verification of models during the design stage is also validated by its successful use in various industrial level examples.

In spite of all of the above advantages, formal verification has not been successfully integrated into many development processes. The main issues arising from such successful integration are related to making formal verification tools easy to use by the system engineers. Formal verification tools typically do not support standard design modeling notations, but they do have their own notations related to the theories of the tool. The extra effort to learn the notations to use these tools is usually not welcome because this effort causes delays in product development. Consequently, there is a need to automate the formal verification process as much as possible.

One possible step towards automation is to make formal verification tools available in notations that system engineers typically use. Model Based Development tools from Mathworks like Simulink, Stateflow, etc. are extensively used by the assignee of the present application for development. It would be desirable for these notations to automatically link to suitable model checking tools. The model can then be formally verified to satisfy its functional requirements automatically using a model checker such as the NuSMV model checker, thereby reducing defect leakage from the design.

As an example, a translator, that is described below in the detailed description and that translates from a Simulink model to a NuSMV model that can then be checked by a NuSMV model checker, can be devised. NuSMV is a symbolic model checker jointly developed by ITC-IRST, CMU, University of Genova, and University of Trento. This translator would then be usable to take a Simulink model as an input and to generate an equivalent NuSMV model.

Such a translator would support all of the basic blocks of the Simulink block library that constitute a finite state subset of Simulink, i.e., any model obtained by putting together these blocks is merely a finite state machine. The NuSMV model generated by the translator would then be formally verified using the NuSMV model checker. The NuSMV model checker supports specification of functional requirements as formulas of the formal language temporal logic. The logic is capable of expressing typical functional requirements like those of safety properties, avoiding deadlocks, race conditions etc.

Various mechanisms and tools have been developed for formally verifying Simulink and Stateflow models. A tool denoted sf2SMV is a research tool developed at CMU for converting Stateflow models into the model checking tool SMV, which is similar to NuSMV. However, Stateflow constitutes just one toolbox in Simulink. Also, it would be better if a translator would support Simulink blocks in addition to Stateflow blocks.

Checkmate is another research tool developed to translate Simulink models into hybrid automata notation so that models capturing both discrete and continuous properties can be verified. Checkmate performs verification of Simulink models using finite state approximations of hybrid automata where the verification need not complete due to bad approximations. By contrast, verification of Simulink models by the NuSMV model checker can be performed against temporal logic properties such that the NuSMV model checker substantially always terminates with a yes/no answer.

The SCADE design verifier that is combined with the SCADE-Simulink gateway is available from Esterel Technologies, is a part of SCADE-Suite™, and can be used to formally verify Simulink models by translating them into the notation of SCADE. However, SCADE provides support for verification of requirements specified as safety properties only and not arbitrary temporal logic formulas (that are more expressive) as is possible using NuSMV.

Embedded Validator from OSC Embedded Systems AG provides a mechanism for formally verifying Simulink and Stateflow models using the VIS and Prover Plug-in verification engines in the background. However, the requirements that the model can be verified against are fixed a priori, whereas NuSMV supports verification of arbitrary temporal logic based functional requirements.

A proposal for model based safety analysis has been offered to verify the safety properties of Simulink models and uses a two-step translation. In the first step, Simulink models are translated into Lustre, which is the textual notation of SCADE that is used to specify models. In the second step, the Lustre model is translated into NuSMV. However, a direct translation from Simulink models to NuSMV is desirable and would reduce the verification effort and time.

SUMMARY OF THE INVENTION

In accordance with one aspect of the present invention, a method for configuring a system model for formal verification comprises the following: receiving the source model as an input, wherein the source model has information about source blocks constructing the source model; parsing each of the source blocks to evaluate the information associated therewith; and, translating the source model to an output model by selecting verification functional characteristics for the output model in accordance with the information about the source blocks.

In accordance with another aspect of the present invention, a method for configuring a source model for formal verification comprises the following: receiving the source model as an input, wherein the source model has information about source blocks constructing the source model; parsing each of the source blocks to select certain items of the information; directly converting the source blocks to modules of an output model; and, populating the modules with verification functional characteristics corresponding to the selected items of information.

In accordance with still another aspect of the present invention, a method for configuring a Simulink model for formal verification comprises the following: receiving the Simulink model as an input, wherein the Simulink model has information about Simulink blocks constructing the Simulink model; parsing each of the Simulink blocks to select certain items of the information including information on input and output ports of the Simulink blocks; directly converting the Simulink blocks to NuSMV modules of an NuSMV model in accordance with the selected items of information; and, populating the NuSMV modules with verification functional characteristics corresponding to the selected items of information.

In accordance with yet another aspect of the present invention, a method for translating a source model to a checking model that can be formally verified comprises the following: receiving the source model as an input, wherein the source model has information about source blocks constructing the source model; parsing each of the source blocks to select certain items of the information; populating a graph containing nodes with the items of information; and, writing a file corresponding to the checking model based on the graph.

BRIEF DESCRIPTION OF THE DRAWINGS

These and other features, aspects, and advantages of the present invention will become better understood when the following detailed description is read with reference to the accompanying drawings in which wherein:

FIG. 1b, depicts a flow chart for the PopulateSubsystem sub-routine of FIG. 1a;

DETAILED DESCRIPTION

Figure 1A:
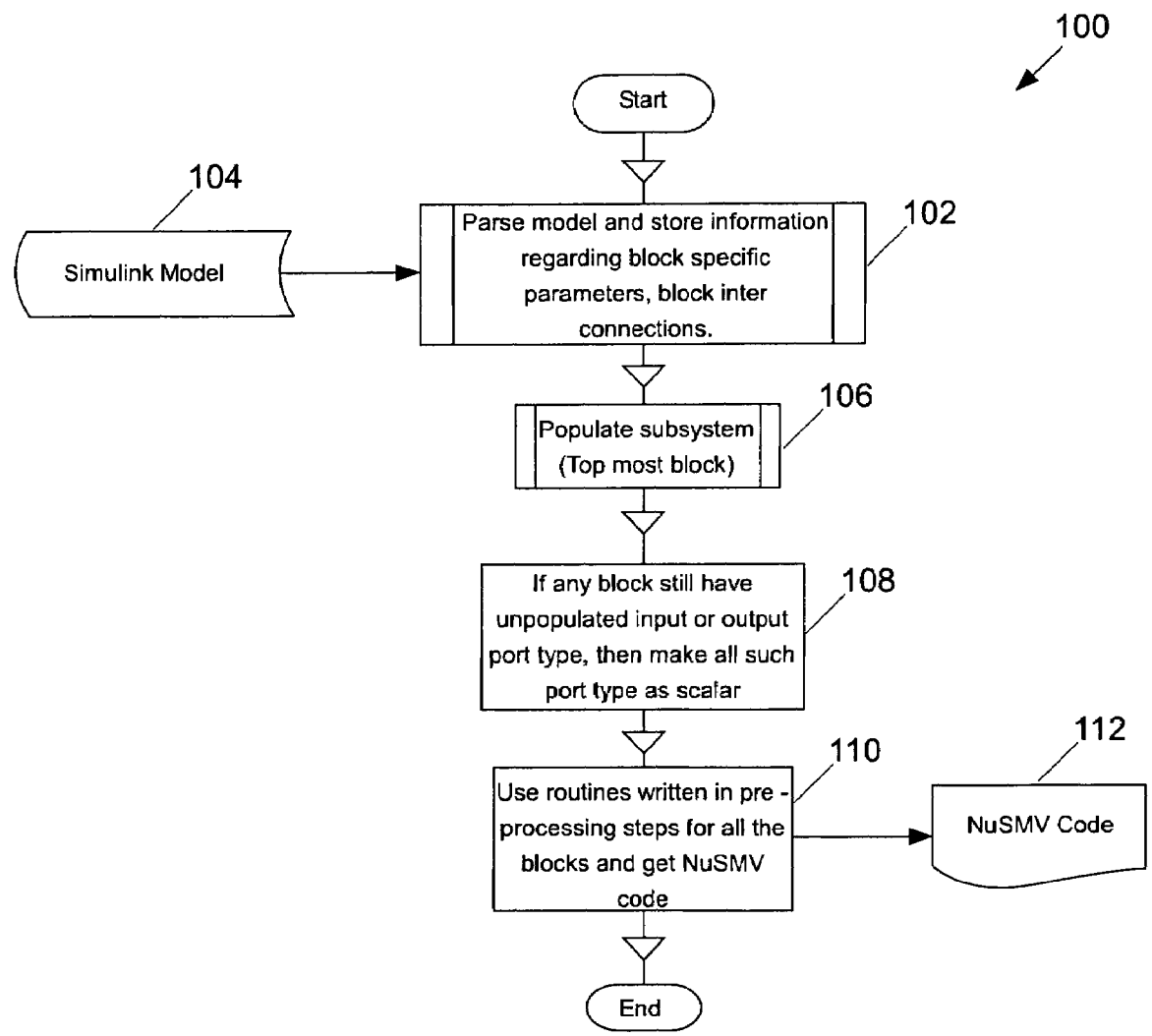
FIG. 1a depicts a flow chart representing a translator that converts a model simulating a design to be verified into a model suitable for checking by a model checker.

Simulink is a computer aided design tool widely used in the aerospace industry to design, simulate, and auto code software for avionics equipment. A Simulink model of a system is a hierarchical representation of the design of the system using a set of blocks that are interconnected by lines. Each block of the Simulink model represents an elementary dynamic system that produces an output either continuously (continuous block) or at specific points in time (discrete block). The lines of the Simulink model represent connections between block inputs and block outputs. Each block of the Simulink model is an instance of a specific type of block, usually from a library provided in Simulink. These blocks are interconnected to build sub-systems which in turn can be put together to form a system model. An arrangement of sub-systems of interconnected blocks is also referred to as the control flow diagram depicting the system model. Simulink is expressive enough to model many avionics systems and offers extensive simulation capabilities for de-bugging.

NuSMV is an open source symbolic model checker based on Binary Decision Diagrams (BDD). It allows for the description of systems as NuSMV models in the form of finite state machines, both synchronous and asynchronous. A system model is described as a collection of modules, and each module can be thought of as describing an elementary finite state machine. Functional requirements of such a model describe properties related to the behavior of the system. Specifications of functional requirements regarding the system model can be given as Computation Tree Logic (CTL) and Linear Temporal Logic (LTL) formulas. Model checking algorithms in NuSMV check to see if the system model meets its specifications. In performing this check, NuSMV uses very efficient BDD-based and SAT-based model checking techniques that are ideally suited for verifying hardware and system models with control flow similar to hardware. (SAT is short for "Satisfiability". SAT-based model checking techniques are model checking algorithms based on Boolean satisfiability procedures. The system model is represented as a Boolean formula, and the model checking problem of the system is reduced to that of determining whether the Boolean formula has a satisfying assignment.)

The data flow block diagram of a Simulink model resembles a hardware design even though Simulink models are generally implemented in software. Because a Simulink model resembles a hardware design, and because NuSMV is ideally suited for verifying hardware and system models with control flow similar to hardware, NuSMV may be chosen as the target formal verification tool to receive the translation of Simulink diagrams. Moreover, NuSMV is open source. However, other verifiers are possible.

A translator 100 as shown in FIGS. 1a, 1b, 1c, and 1d operates to receive an input in the form of a textual representation of a Simulink model and to provide an output in the form of a NuSMV model that is equivalent to the Simulink model. Accordingly, the Simulink model may be referred to as a source model of the translator 100, and the NuSMV model may be referred to as an output model of the translator 100. Generally, there is a one-to-one correspondence between the blocks in the source model and the blocks in the output model. Although the translator 100 is conveniently shown as an algorithm, the translator 100 may be implemented in other forms. The textual representation can be in any format that captures the details of the given Simulink model such as the representations provided by Matlab (.mdl file, for example), or representations like those of XML, etc.

The translator 100 supports the basic blocks that constitute a finite state subset of Simulink. That is, any Simulink model obtained by putting together these blocks is nothing but a conventional finite state machine. Blocks for signal routing, for logic and bit operations, for math operations (discrete), for sources, for discontinuities, and for discrete libraries are supported with integer and Boolean data types for variables. Appendix 1 at the end of this specification shows a detailed Library-wise list of the various basic blocks that can be supported by the translator 100.

Figure 1B:
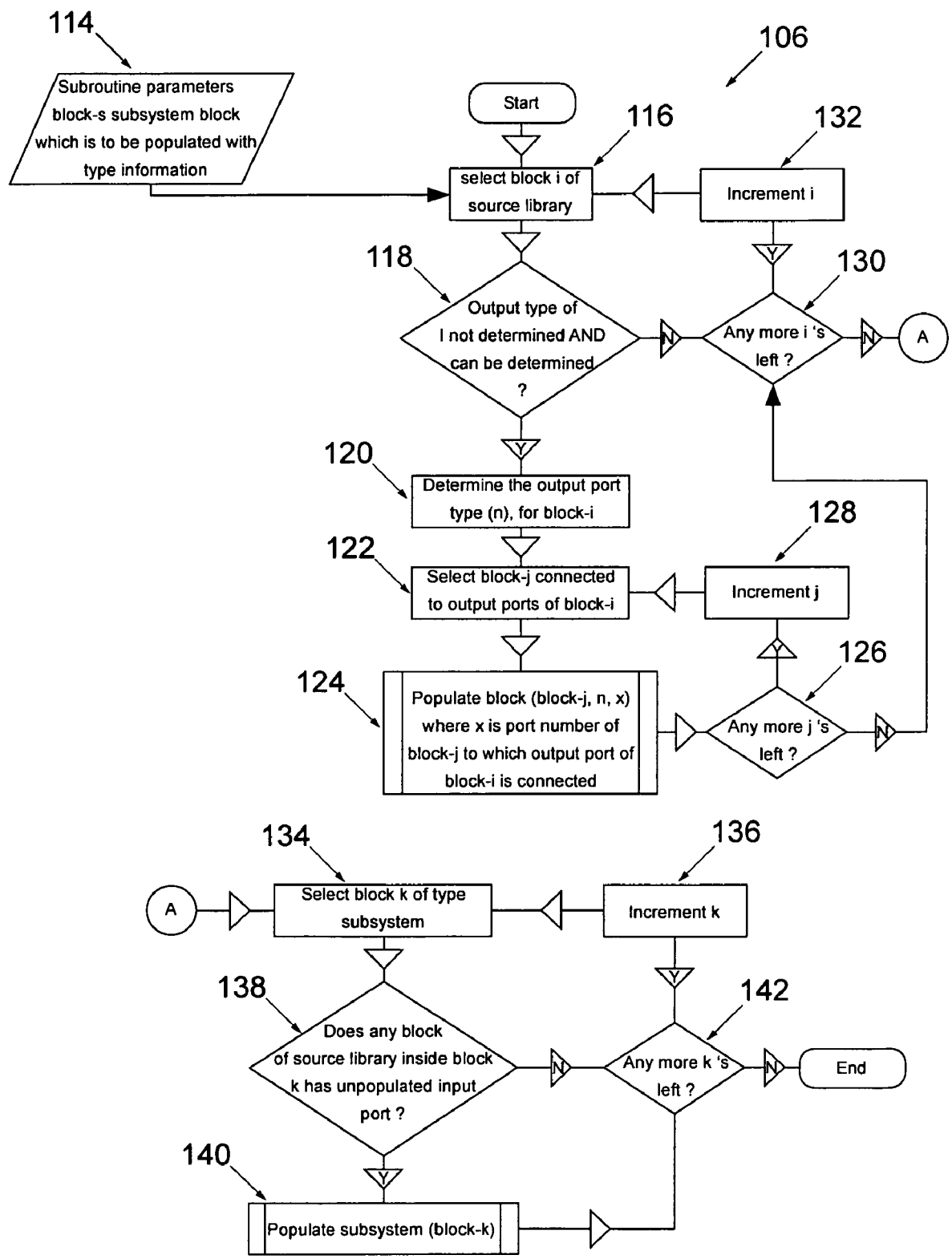

The translator 100 can be summarized as comprising an input, an output, and an algorithm. The input is a textual representation of a Simulink model. The output is a NuSMV code equivalent to the Simulink model. The algorithm is performed, for examples, in three steps 102, 104, and 106 (FIGS. 1a and 1b). The first step 102 includes blocks 108, 110, and 112 of FIGS. 1a and 1b, the second step 104 includes blocks 114, 116, 118, 120, 122, 124, and 126 of FIGS. 1a and 1b, and the third step 106 includes blocks 128 and 130 of FIGS. 1a and 1b. The second step may be considered to be subdivided into three sub-steps. In addition, there is a pre-processing step.

Figure 2:
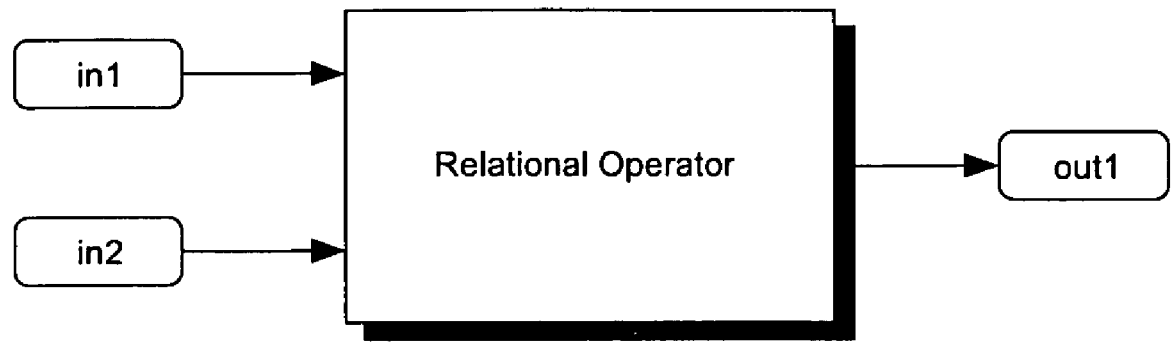
FIG. 2 illustrates an example of an output of the routine of a preprocessing step of one embodiment of a translation algorithm disclosed herein by illustrating the relational basic block of the logic and bit operations library of Simulink and its equivalent NuSMV code.

In the preprocessing step, a set of routines are written to translate each of the basic blocks in the Simulink library listed in Appendix 1 into their equivalent NuSMV modules. These routines will be used by the translator 100 while generating the NuSMV models from the input Simulink models. An example of the output of this preprocessing step for a basic block relational operator 200 (of the logic and bit operations library of Simulink) of this Library is shown in FIG. 2. The relational operator 200 is <=(less than or equal to) and the block has two inputs, the first one being a vector of length two and the second one being a scalar. FIG. 2 illustrates the functionality of these routines. These routines should be written to be very specific to the kind of basic blocks in Simulink and should be written in such a way that the resulting NuSMV module does exactly what the Simulink basic block will do for the particular input type.

The translator 100 can be summarized as comprising an input, an output, and an algorithm. The input is a textual representation of a Simulink model. The output is a NuSMV code equivalent to the Simulink model. The algorithm is described in the pseudo code of Appendix 2. The algorithm has four steps as given in FIG. 1a. The second step 106 is a sub-routine, details of which are shown in FIG. 1b. In addition, there is a pre-processing step.

In the algorithm description, the term Type is used for the input port signal, the output port signal, and block parameters. The type of a signal or parameter tells whether it is a scalar or a one dimensional vector of a particular size.

In the preprocessing step, a set of routines is written to translate each of the basic blocks in the Simulink library listed in Appendix 1 into their equivalent NuSMV modules. These routines will be used by the translator 100 at 110 while generating the NuSMV models from the input Simulink models. An example of the output of this preprocessing step for the basic block corresponding to a relational operator 200 (of the logic and bit operations library of Simulink) of this Library is shown in FIG. 2. The relational operator 200 is <=(less than or equal to) and the block has two inputs, the first one being a vector of length two and the second one being a scalar. FIG. 2 illustrates the functionality of the routines in the preprocessing step. These routines are written specific to a particular type of block and, being provided with information regarding type of block, number of input ports, number of output ports, type of ports, and block parameters (like for relational block relational operator, for add block type of signs), they will generate a NuSMV module equivalent to a basic Simulink block. Pseudo code for a routine in the library that will generate NuSMV code for Simulink basic block for relational operator block as illustrated in FIG. 2 is given in Appendix 3. Developing such pseudo codes constitute the preprocessing step of the algorithm.

In the first step 102, the Simulink model is parsed. In parsing the model, the Simulink model is read from its textual representation, information irrelevant for the translator involving the graphics of the model (like color, font size, etc.) is discarded, and information regarding blocks and sub-systems, input and output ports connections, block specific parameters, inter-connection of blocks, etc. is extracted.

A graph like data structure is used to store information read from the Simulink model in the first step 102 of algorithm. A node of the graph represents a basic Simulink block and contains information extracted from the input file. The parents of a child node are all nodes whose output ports are connected to the input ports of the child node. The children nodes of a parent node are all nodes whose input ports are connected to the output ports of the parent node. If a node is for a block of type Sub System, then this node will also contain a list of nodes for all blocks present in the Sub System.

In the second step 106, the nodes of the graph are populated with type information for their input and output ports. In order to compute the type information for the input and output ports of each subsystem, a sub-routine PopulateSubsystem is executed starting with the outermost block. In PopulateSubsystem, a walk through the output of the parsing step 102 (the first step described above) is performed such that the type information of the input ports of a block is made the same as the output ports from the preceding block.

Output signal types for a block are determined from the input ports type and block specific parameters (except for a block in the source library for which the output signal type can directly be inferred from the block parameters only). For determining the output port signal type, the execution semantics of Simulink provide that a) the output signal type of a block should be same as that of the input and block parameter type and all vector type inputs and b) all vector input types and parameters of a block should be of same size. So, while populating blocks with type information, if any of the inputs or the block parameters is of the type vector, then the output type is concluded to be of the type vector of the same dimension; otherwise, if all input and block parameters are scalar, then the output type is concluded as being of the type scalar.

As shown in FIG. 1b, the sub-routine 106 is executed for a sub-system block which is passed as a parameter (block-s) to the routine at 114. Block i (inside of block-s) of the source library is selected at 116. At 118, if type information of the output ports of block i has not been determined and can be determined, control is passed to 120; else, control is passed to 130. At 120, the type information for the output ports of block i is determined which will be the input type for all input ports connected to the output port of block i. Now, the sub-routine PopulateBlock (described in 210) is called for all blocks connected with the output port of block i in the loop that includes steps 122, 124, 126, and 128.

Once all blocks connected to block i are processed, control is transferred to 130. At 130, if any more unprocessed source blocks remain to be processed, then control is passed to 132 where i is incremented and flow returns to the block 116.

After all block i's have been processed, control is passed to 134. Now all the subsystems blocks inside block-s are processed to check for any unpopulated source blocks. This processing is done to check for any sub-systems which do not have any input port, hence they will not be processed as they are not in the path of children nodes of any of the source library blocks of the top-most system.

At 134, block k is selected, which is a sub system block and is inside block-s, and control is transferred to 138. At 138, if sub-system block k has any source blocks which are not yet populated, then the PopulateSubsystem routine 106 is executed for sub-system block k at 140, and control is transferred to 142 to determine whether there are any more sub-system block k's to process. If there are, then control is transferred to 136 where k is incremented and control is returned to 134 to select the next sub-system block for processing. If condition at 142 is false, sub-routine 106 ends.

Figure 1C:
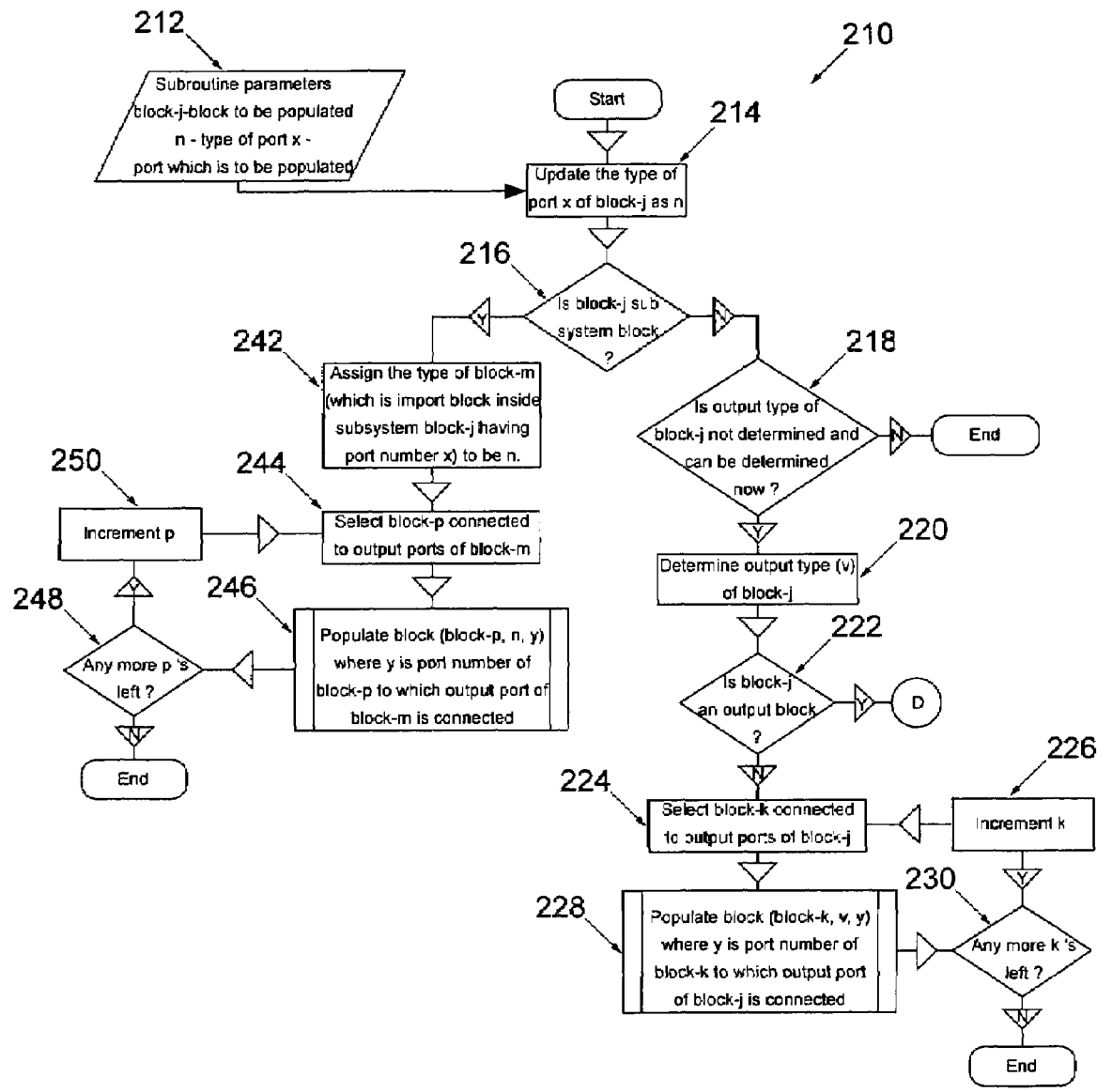
FIGS. 1c and 1d depict flow chart for the PopulateBlock sub-routine of FIG. 1b.
Figure 1D:
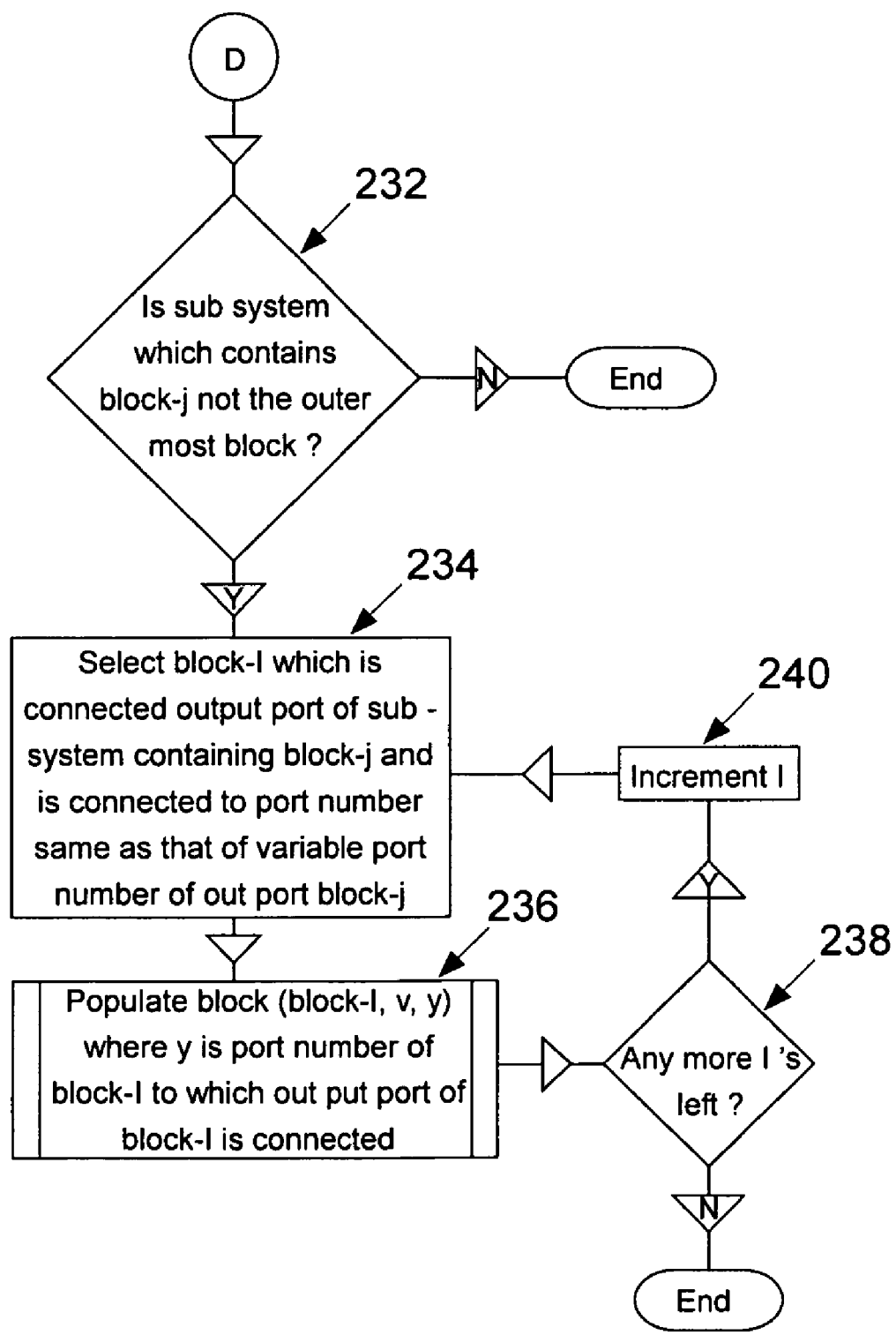

Sub-routine 210 as shown in FIGS. 1c and 1d is used by the PopulateSubsystem routine 106 for populating the input ports of a block and, if possible, to calculate the output port types for a block. The sub-routine 210 will also populate the input and output ports of children blocks assuming that it is possible to do so from the information acquired about the input ports.

The sub-routine 210 needs three parameters shown at 212 to be passed by the caller. These parameters are a) the block to be populated, block-j, b) the Type of the input port to be assigned, n, and c) the port number of block which is to be assigned with the type passed as parameter, x.

In first step of 210, the input port x of block-j is assigned as type n at 214 and control passes to 216. If block-j is of type sub-system, then control is transferred to 242; otherwise, control is transferred to 218. At 218, if any decision regarding the output type of block-j can be made (given the input port types populated so far and block parameters), then control is passed to 220. An example involving the decision related to the output port type is the following: for the Add block, if the input port which has been populated now is a vector, then the output type will also be of the type vector of same size, irrespective of the type of other ports; also, if all of the input ports of the Add block have been populated and are found to be scalar, then the output type will also be scalar. This processing is according to Simulink execution semantics described above.

At 220, the output port type of block-j is determined; this output port type will be the same as the input type for block input ports which are connected to block-j. If block-j is an Outport, then control is passed to 232 of FIG. 1d; else, control is transferred to 224 so as to populate the input ports of the blocks connected to block-j with type information and to also determine the output ports type, if possible. At 224, block-k connected to the output port of block-j is selected, and control is transferred to 228 where the PopulateBlock subroutine 106 is executed for block-k, after which control is passed to 230. At 230, if any more k blocks remain to be processed, control is passed to 226 which increments k and passes control back to 224.

If at 222 control is passed to 232 then, at 232, a check is made to determine if the sub-system which contains the block-j is the outermost block. If block-j is the outermost block, then block-j will not have any block connected to its output port and the routine terminates; otherwise, control is transferred to 234 where a block-l connected to the output port of the subsystem containing block-j is selected, and block l is connected to the port of sub-system which has the same port number as block-j. Then control is transferred to 236 where the PopulateBlock is executed for block-l. All such l blocks are processed in the loop that includes 238, 240, 234, and 236, after which the routines terminate.

If at 216, block-j is found to be a sub-system block, control is passed to 242. At 242, block-m, which is an inport having the parameter port number 'x' (passed as a sub routine parameter), is selected and is made to be type 'n' after which control passes to 244 where, for all blocks connected to block m, the sub-routine Populateblocks is called at 246. If not all blocks connected to block m are processed as determined at 248, p is incremented at 250 and control passes back to 244. When all such blocks have been processed as determined at 248, the sub-routine terminates.

It is to be noted that the second step 106 is guaranteed to terminate as the model has a fixed number of blocks.

After processing at 106, some of the input or output ports may still remain unpopulated, which can happen in the case where there is an input port in the feedback path of a signal. In this case, all graph nodes having any input ports or output ports type unpopulated are made to be scalar at 108.

At 110, the final file containing the NuSMV model is written. More specifically, the routines from the pre-processing step are used to write the NuSMV model such that each basic block is replaced by its equivalent modules(s). Here again, sub-systems are translated first in order to respect the hierarchy in the model. The NuSMV model is output at 112.

Figure 5:
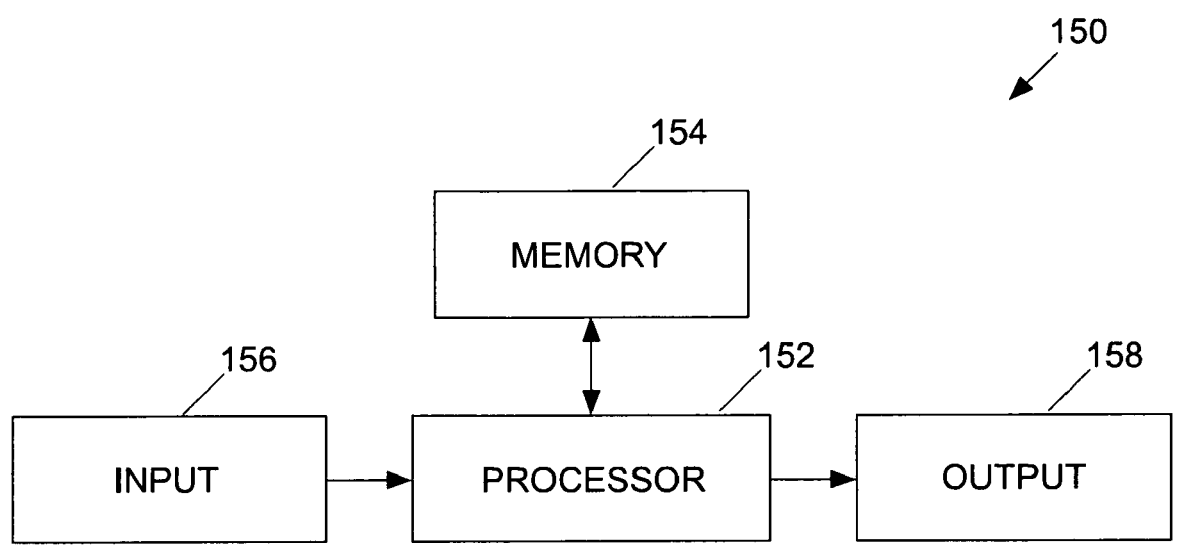

In one embodiment, the translator 100 can be executed on a computer 150 (FIG. 5) that includes a processor 152, a memory 154, an input 156, and an output 158. The processor 152 executes the translator 100 which is stored in the memory 154 along with the data structure and the Simulink model. The memory 154 may be a hard drive, a flash memory, a floppy drive, a CD and/or DVD drive, and/or any other suitable memory device that stores data structure and the Simulink model. The input 156 may be a mouse, a keyboard, a disk drive and/or other device that can be used by a user to input the Simulink model and to initiate execution of the translator 100. The output 158 may be a display, a printer, a disk drive and/or other device that can be used to provide the NuSMV as an output.

However, the translator 100 can be performed on other devices such as an ASIP, programmable field arrays, dedicated circuits, etc.

Pseudo code corresponding to the translator 100 is given in Appendix 2 which follows Appendix 1 at the end of this specification. This pseudo code implements steps 1, 2, and 3 as described above.

The following is an example involving a typical avionics triplex sensor voter. This example is explained more fully below. Digital flight control systems utilize redundant hardware to meet high reliability requirements. Use of redundant hardware poses two problems: distinguishing between operational and failed units, and computing the "mean" value of the data from various operational units for use by other components. A key part of redundant systems focuses on managing redundant sensors to provide high integrity measurement for use by down-stream control calculations. The present example considers a generic voter algorithm that manages three redundant sensors. This class of algorithms is applicable to a variety of sensors used in modern avionics, including rate gyros, air data sensors, surface position sensors, etc.

Traditionally, performance of such algorithms is evaluated using simulations and detailed design FMEAs by tuning vital parameters that influence the performance. Instead, in accordance with various embodiments of the present invention as claimed below, the correctness of the avionics triplex sensor voter design is formally verified by translating a Simulink model of this avionics triplex sensor voter into a corresponding NuSMV model and then checking the NuSMV model by use of the NuSMV model checker.

Figure 3A:
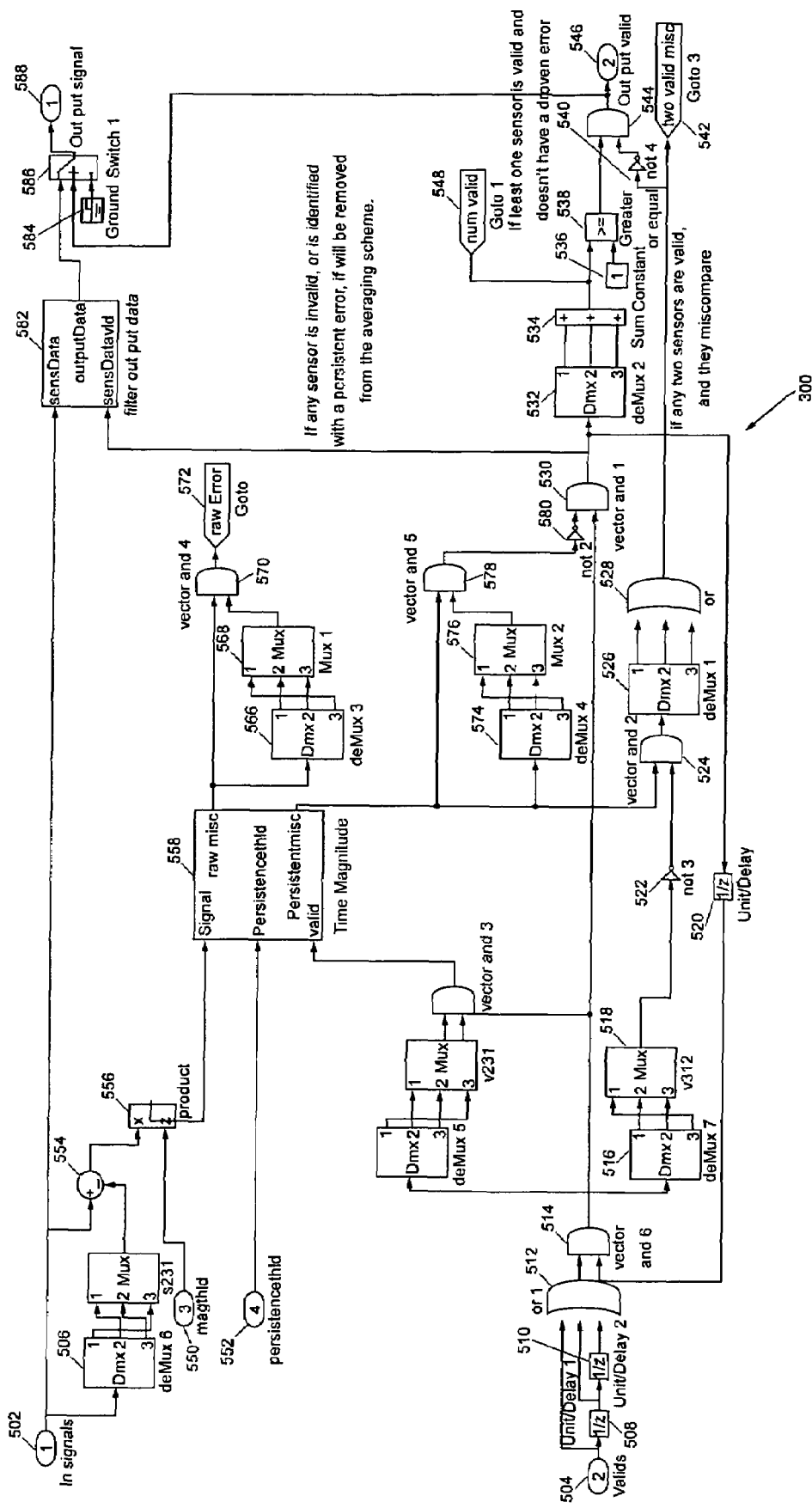
FIGS. 3a, 3b, and 3c are an example of a Simulink model for a triplex sensor voter typically used in avionics; and, FIG. 4 illustrates a model verification example procedure using Simulink, a translator that translates a Simulink model to a NuSMV model, and the NuSMV model checker to verity the NuSMV model; and, FIG. 5 illustrates an example of one device, in this case a computer, on which the translator of FIGS. 1a, 1b, 1c, and 1d may be executed.

Accordingly, this avionics triplex sensor voter is first modeled as a Simulink model 300 using Simulink. The Simulink model 300 of this typical avionics triplex sensor voter is illustrated in FIG. 3a.

Second, the Simulink model of this avionics triplex sensor voter is translated by the translator 100 described above into a NuSMV model using the translation algorithm described herein. Third, the NuSMV model checker is used to verify this NuSMV model, which effectively verifies the Simulink model, which in turn effectively verifies the avionics triplex sensor voter. This procedure is illustrated in FIG. 4.

Figure 4:
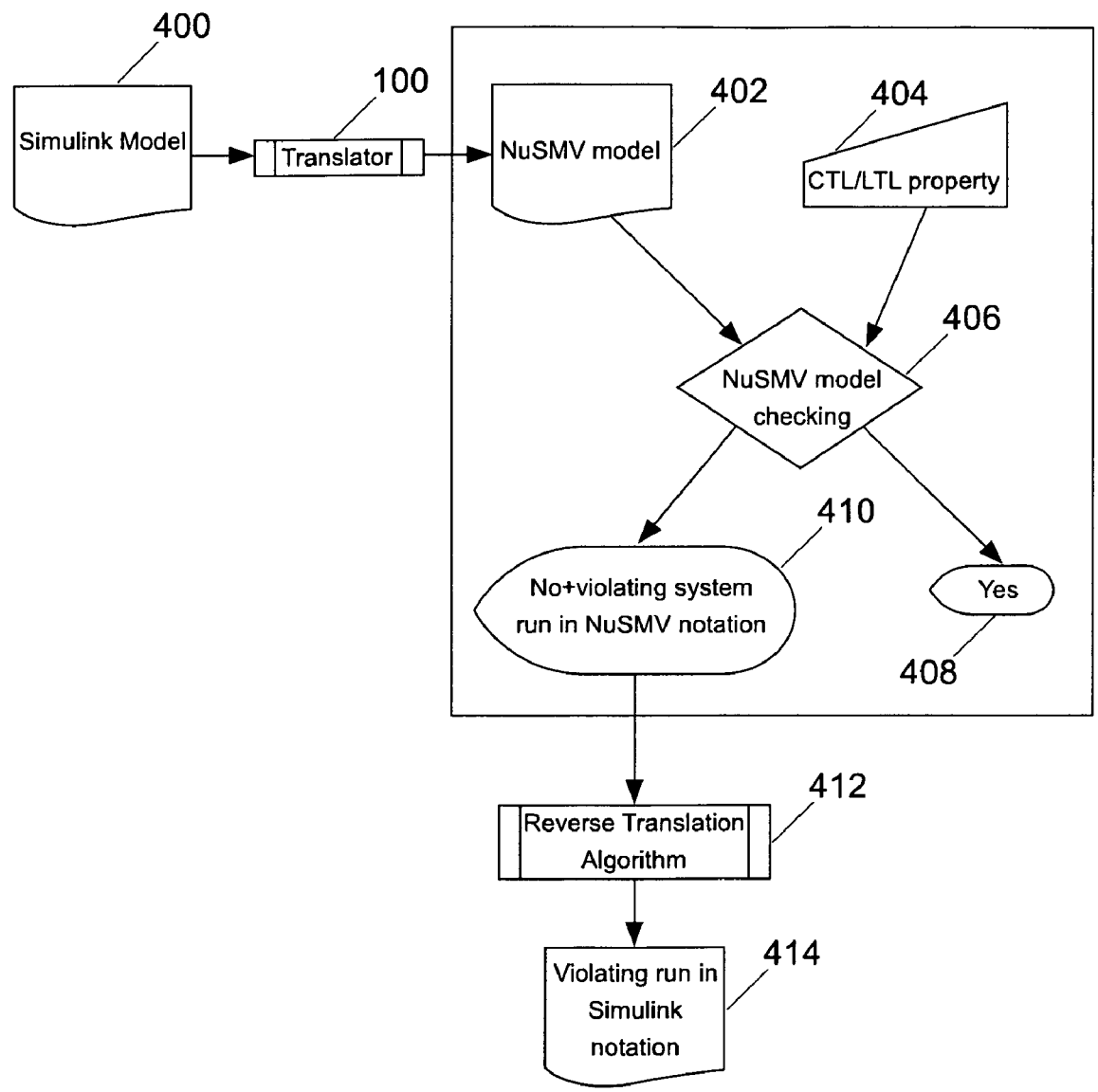

As shown in FIG. 4, a Simulink model 400 is input to the translator 100, and the translator 100 outputs a NuSMV model 402 to a NUSMV model checker 401. Both the NuSMV model 402 and CTL/LTL properties 404 of NuSMV are input to the NuSMV model checker 406. The NuSMV model checker 406 returns a Yes 408 if the design is verified or otherwise returns a violating system run 410 indicating that the design violates its requirements.

The NuSMV model checker can execute on the computer 150 or on any other computer or on any other suitable device.

The avionics triplex sensor voter modeled as the Simulink model 300 takes inputs from three sensors and produces a single reliable sensor output. Each sensor produces a measured data value indicated as input signals at 502 in FIG. 3a and a self-check bit indicated as inputs valid at 504 in FIG. 3a. The self-check bits indicate whether or not the sensor considers itself to be properly operational, i.e., whether the sensor output is valid.

In operation, all valid sensor data are combined by the avionics triplex sensor voter modeled as a Simulink model 300 to produce a single output at 588. If three sensors are available, a weighted average is used in which an outlying sensor value is given less weight than those that are in closer agreement. If only two sensors are available, a simple average is used. If only one sensor is available, its output becomes the voter output. A faulty sensor value is not used in failure comparisons or in the production of the output signal.

A faulty sensor can be detected and eliminated by (i) not using any sensor input whose own self-check bit is false, (ii) next comparing all sensor values two at a time such that, if any difference exceeds a "magnitude threshold", a "magnitude error" for the corresponding sensors is set and such that, if the "magnitude error" persists longer than the "magnitude threshold", a "persistent miscompare" is set at 640, (iii) flagging sensor 2 as the source of a persistent sensor error if sensors 1 and 2 have a "persistent miscompare" and so do sensors 2 and 3 and not using sensor 2, and (iv) outputting a value dependent on the self check bit if only two sensors are valid and they miscompare.

The steps described in (ii) and (iii) above cannot be performed if only two sensors are valid because three valid sensors are required for step (iii). In step (iv), if only two sensors are valid (i.e., their self-check bits are true) and their values exceed the magnitude threshold, then a simple average of their output values is provided as the voter output. In step (iv), if only one sensor is valid (i.e., its self-check bit is true) and its value exceeds the magnitude threshold, then its output value is provided as the voter output.

Some abstractions to the original sensor voter model can be made to make it amenable to be fed as an input to the translator 100. For example, data that sensors measure is assumed to be integers and not floating point numbers as in the original model. It may also be assumed that there cannot be a state in which all three sensors have failed. Additionally, basic blocks corresponding to a lag filter and other components that may be needed to remove "noise" from signals are omitted as a matter of convenience and, therefore, the input does not have these parameters.

The Simulink model 300 is not part of the invention claimed herein. However, its parts are described in the following table. The reference number column contains the reference numerals of FIG. 3a and the block name column contains the corresponding Simulink block names.

| Reference Number | Block Name |
| --- | --- |
| 502 | Inport |
| 504 | Inport |
| 506 | Demux |
| 508 | Unit Delay |
| 510 | Unit Delay |
| 512 | Logical Operator |
| 514 | Logical Operator |
| 516 | Demux |
| 518 | Mux |
| 520 | Unit Delay |
| 522 | Logical Operator |
| 524 | Logical Operator |
| 526 | Demux |
| 528 | Logical Operator |
| 530 | Logical Operator |
| 532 | Demux |
| 534 | Sum |
| 536 | Constant |
| 538 | Relational Operator |
| 540 | Logical Operator |
| 542 | Goto |
| 544 | Logical Operator |
| 546 | Outport |
| 548 | Goto |
| 550 | Inport |
| 552 | Inport |
| 554 | Sum |
| 556 | Product |
| 558 | Subsystem |
| 560 | Demux |
| 562 | Mux |
| 564 | Logical Operator |
| 566 | Demux |
| 568 | Mux |
| 570 | Logical Operator |
| 572 | Goto |
| 574 | Demux |
| 576 | Mux |
| 578 | Logical Operator |
| 580 | Logical Operator |
| 582 | Subsystem |
| 584 | Ground |
| 586 | Switch |
| 588 | Outport |

Figure 3B:
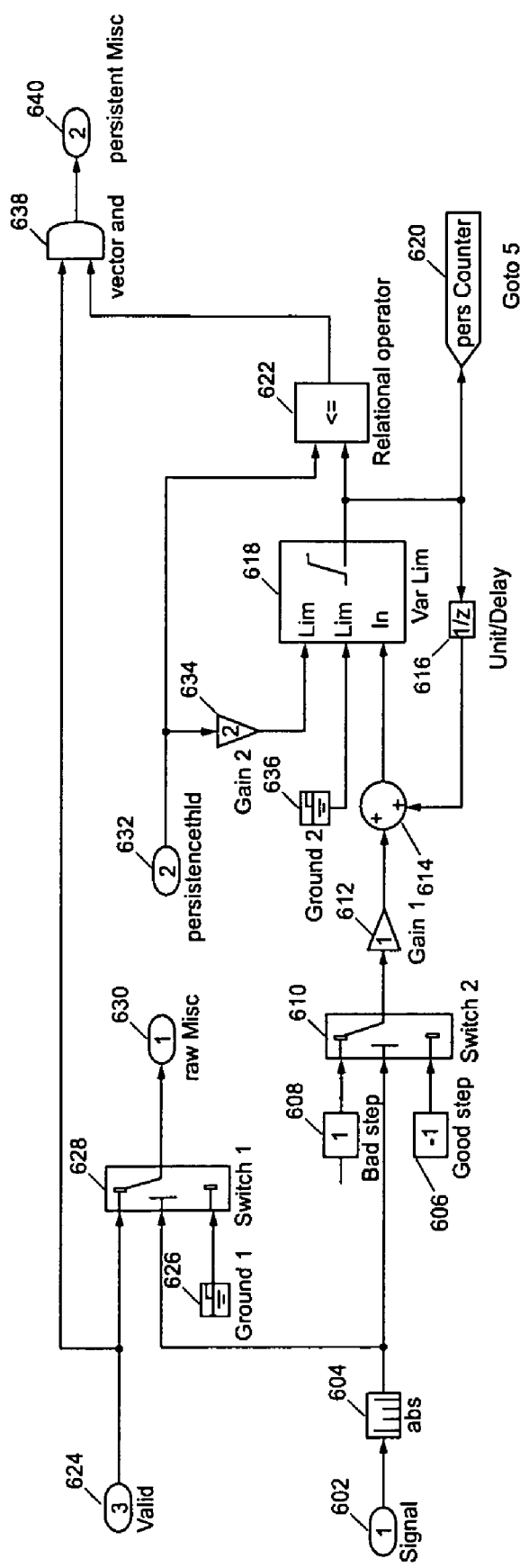

The subsystem 558 is shown in FIG. 3b and the following table lists the parts of the subsystem 558. The reference number column contains the reference numerals of FIG. 3b and the block name column contains the corresponding Simulink block names.

| Reference Number | Block Name |
| --- | --- |
| 602 | Inport |
| 604 | Absolute |
| 606 | Constant |
| 608 | Constant |
| 610 | Switch |
| 612 | Gain |
| 614 | Sum |
| 616 | Unit Delay |
| 618 | Subsystem |
| 620 | Goto |
| 622 | Relational Operator |

| Reference Number | Block Name |
| --- | --- |
| 624 | Inport |
| 626 | Ground |
| 628 | Switch |
| 630 | Outport |
| 632 | Inport |
| 634 | Gain |
| 636 | Ground |
| 638 | Logical Operator |
| 640 | Outport |

Figure 3C:
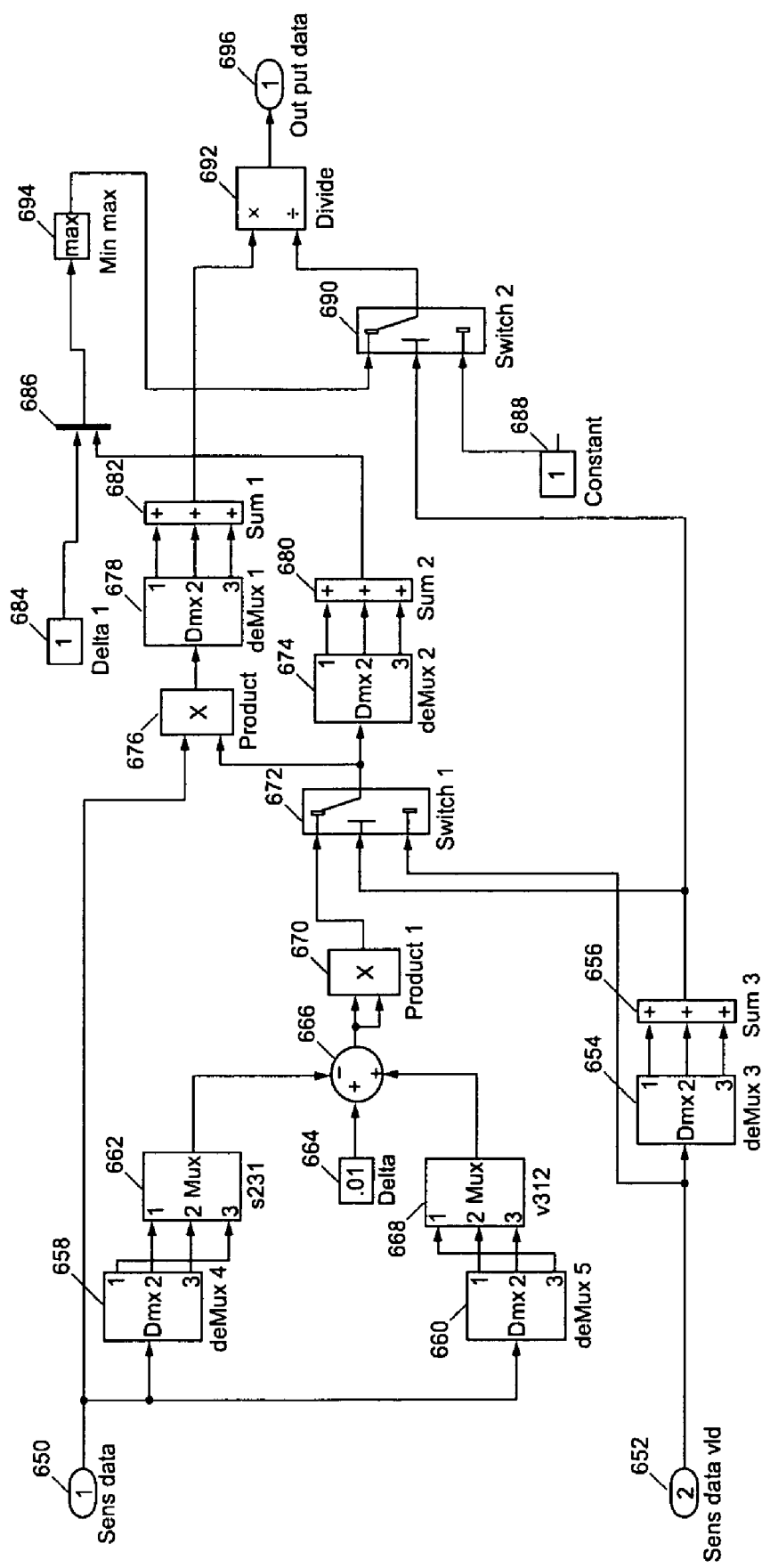

The subsystem 582 is shown in FIG. 3c and the following table lists the parts of the subsystem 582. The reference number column contains the reference numerals of FIG. 3c and the block name column contains the corresponding Simulink block names.

| Reference Number | Block Name |
| --- | --- |
| 650 | Inport |
| 652 | Inport |
| 654 | Demux |
| 656 | Sum |
| 658 | Demux |
| 660 | Demux |
| 662 | Mux |
| 664 | Constant |
| 666 | Sum |
| 668 | Mux |
| 670 | Product |
| 672 | Switch |
| 674 | Demux |
| 676 | Product |
| 678 | Demux |
| 680 | Sum |
| 682 | Sum |
| 684 | Constant |
| 686 | Mux |
| 688 | Constant |
| 690 | Switch |
| 692 | Product |
| 694 | Min max |
| 696 | Outport |

The NuSMV code corresponding to the full model is long and hence only the code corresponding to the "Time magnitude" sub-system is shown below. This code is automatically generated by the translator 100. Block and sub-system names as found in the Simulink model are provided (automatically by the translator 100) as comments to make it more readable.

```
--*****SUBSYSTEM NAME :timeMagnitude***************
MODULE timeMagnitude__33(Signal, persistenceThld, Valid)
    VAR
        Ground2 : Ground1( );
        Ground1 : Ground1( );
        GoodStep : Constant1(GoodStep__CONSTANT);
        BadStep : Constant1(BadStep__CONSTANT);
        Gain2 : Gain1(persistenceThld, Gain2__GAIN);
        abs : abs__34(Signal);
        Switch1 : SwitchMixed__4(Valid, Ground1.out, abs.out, Switch1__THRESHOLD, 0);
        Switch2 : SwitchMixed__5(BadStep.out, GoodStep.out, abs.out,
            Switch2__THRESHOLD, 0);
        Gain1 : Gain3(Switch2.out, Gain1__GAIN);
        Sum1 : Add3__Ip2(Gain1.out, UnitDelay.out, 0, 0);
        varLim : varLim__35(Gain2.out, Ground2.out, Sum1.out);
        UnitDelay : UnitDelay3__m32767__32767(varLim.out,
            UnitDelay__INITCONDITION);
        RelationalOperator : RelationalMixed__2(persistenceThld, varLim.out, 3);
        vectorAnd : vectorAnd__36(Valid, RelationalOperator.out);
    DEFINE
        GoodStep__CONSTANT := -1;
        BadStep__CONSTANT := 1;
        Gain2__GAIN := 2;
        Switch1__THRESHOLD[0] := 1;
        Switch1__THRESHOLD[1] := 1;
        Switch1__THRESHOLD[2] := 1;
        Switch2__THRESHOLD[0] := 1;
        Switch2__THRESHOLD[1] := 1;
        Switch2__THRESHOLD[2] := 1;
        Gain1__GAIN[0] := 1;
        Gain1__GAIN[1] := 1;
        Gain1__GAIN[2] := 1;
        UnitDelay__INITCONDITION[0] := 0;
        UnitDelay__INITCONDITION[1] := 0;
        UnitDelay__INITCONDITION[2] := 0;
        out1[0] := Switch1.out[0];
        out1[1] := Switch1.out[1];
        out1[2] := Switch1.out[2];
        out2[0] := vectorAnd.out[0];
        out2[1] := vectorAnd.out[1];
        out2[2] := vectorAnd.out[2];
```

-continued

```
            out3[0] := varLim.out[0];
            out3[1] := varLim.out[1];
            out3[2] := varLim.out[2];
-- *************** GROUND BLOCK WITH 1-COMPONENT OUTPUT
***************
MODULE Ground1
     DEFINE
          out := 0;
--*** CONSTANT BLOCK WITH 1-COMPONENT CONSTANT VALUE *******
MODULE Constant1 ( value )
     DEFINE
          out := value;
--*** BLOCK FOR GAIN OPERATOR WHERE BOTH INPUT AND GAIN ARE SCALAR
*****
MODULE GainUnit ( in1, gain )
     DEFINE
          out := in1 * gain;
--** GAIN BLOCK WITH 1-COMPONENT INPUT *** gain ALSO HAS DIMENSION **
MODULE Gain1 ( in1, gain )
     VAR
          gain1 : GainUnit ( in1, gain );
     DEFINE
          out := gain1.out;
--********** BLOCK FOR ABS OPERATOR WHERE INPUT IS A SCALAR ******
MODULE AbsUnit ( in1 )
     DEFINE
          out := case
               in1 >= 0 : in1;
               1 : 0 - in1;
          esac;
--*************** ABS BLOCK WITH 3-COMPONENT INPUT *******
MODULE Abs3 ( in1 )
     VAR
          abs1 : AbsUnit ( in1[0] );
          abs2 : AbsUnit ( in1[1] );
          abs3 : AbsUnit ( in1[2] );
     DEFINE
          out[0] := abs1.out;
          out[1] := abs2.out;
          out[2] := abs3.out;
--*****SUBSYSTEM NAME :abs***************
MODULE abs__34(__1)
     VAR
          Abs__1 : Abs3(__1);
     DEFINE
          out[0] := Abs__1.out[0];
          out[1] := Abs__1.out[1];
          out[2] := Abs__1.out[2];
--** SWITCH BLOCK FOR 2 INPUTS WITH 1 COMPONENT ******
--****THREE CONDN ARE: GE = 0, G = 1, NEQZ = 2 *****
MODULE SwitchUnit ( in1, in2, ctrl, thrshold, condn)
     DEFINE
          out := case
               condn = 0 & ctrl >= thrshold : in1;
               condn = 0 & !(ctrl >= thrshold) : in2;
               condn = 1 & ctrl > thrshold : in1;
               condn = 1 & !(ctrl > thrshold) : in2;
               condn = 2 & ctrl != 0 : in1;
               condn = 2 & !(ctrl != 0) : in2;
          esac;
--****************SWITCH BLOCK FOR MIXED INPUT************
MODULE SwitchMixed__4( in1, in2, ctrl, threshold, condn)
     VAR
          Switch1 : SwitchUnit( in1[0], in2__vector[0], ctrl[0], threshold[0], condn );
          Switch2 : SwitchUnit( in1[1], in2__vector[1], ctrl[1], threshold[1], condn );
          Switch3 : SwitchUnit( in1[2], in2__vector[2], ctrl[2], threshold[2], condn );
     DEFINE
          in2__vector[0] := in2;
          in2__vector[1] := in2;
          in2__vector[2] := in2;
          out[0] := Switch1.out;
          out[1] := Switch2.out;
          out[2] := Switch3.out;
--****************SWITCH BLOCK FOR MIXED INPUT ************
MODULE SwitchMixed__5( in1, in2, ctrl, threshold, condn)
     VAR
          Switch1 : SwitchUnit( in1__vector[0], in2__vector[0], ctrl[0], threshold[0], condn );
          Switch2 : SwitchUnit( in1__vector[1], in2__vector[1], ctrl[1], threshold[1], condn );
          Switch3 : SwitchUnit( in1__vector[2], in2__vector[2], ctrl[2], threshold[2], condn );
```

```
        DEFINE
            in1_vector[0] := in1;
            in1_vector[1] := in1;
            in1_vector[2] := in1;
            in2_vector[0] := in2;
            in2_vector[1] := in2;
            in2_vector[2] := in2;
            out[0] := Switch1.out;
            out[1] := Switch2.out;
            out[2] := Switch3.out;
--*************** GAIN BLOCK WITH 3-COMPONENT INPUT ***************
--*************** gain ALSO HAS DIMENSION 3 ***************
MODULE Gain3 ( in1, gain )
        VAR
            gain1 : GainUnit ( in1[0], gain[0] );
            gain2 : GainUnit ( in1[1], gain[1] );
            gain3 : GainUnit ( in1[2], gain[2] );
        DEFINE
            out[0] := gain1.out;
            out[1] := gain2.out;
            out[2] := gain3.out;
--**** ADD OPERATOR BLOCK FOR 2 SCALAR INPUT *** SIGNS ARE 0 : +, 1 : -
****
MODULE AddUnit_Ip2 ( in1, in2, sign1, sign2 )
        DEFINE
            temp1 := case
                sign1 = 0 : in1;
                sign1 = 1 : 0 - in1;
            esac;
            temp2 := case
                sign2 = 0 : in2;
                sign2 = 1 : 0 - in2;
            esac;
            out := temp1 + temp2 ;
--*** ADD BLOCK FOR 2 VECTOR INPUT(S) EACH WITH DIMENSION 3 *******
MODULE Add3_Ip2 ( in1, in2, sign1, sign2 )
        VAR
            add1 : AddUnit_Ip2 ( in1[0], in2[0], sign1, sign2 );
            add2 : AddUnit_Ip2 ( in1[1], in2[1], sign1, sign2 );
            add3 : AddUnit_Ip2 ( in1[2], in2[2], sign1, sign2 );
        DEFINE
            out[0] := add1.out;
            out[1] := add2.out;
            out[2] := add3.out;
--******** MINMAX OPERATOR BLOCK FOR 2 SCALAR INPUT ********
--******** OPERATORS ARE 0 : min, 1 : max ***********
MODULE MinMaxUnit_Ip2 ( in1, in2, operator )
        DEFINE
            temp1 := in1;
            temp2 := case
                operator = 0 & temp1 < in2 : temp1;
                operator = 1 & temp1 > in2 : temp1;
                1 : in2;
            esac;
            out := temp2;
--**** MINMAX BLOCK FOR 2 VECTOR INPUT(S) EACH WITH DIMENSION 1 *****
MODULE MinMax1_Ip2 ( in1, in2, operator )
        VAR
            minMax1 : MinMaxUnit_Ip2 ( in1, in2, operator );
        DEFINE
            out := minMax1.out;
--**********MINMAX OPERATOR BLOCK FOR MIXED INPUT ****
--*******SIGNS ARE 0 : +, 1 : - ********
MODULE MinMaxMixed_1( in1, in2, operator)
        VAR
            minmax1 : MinMaxUnit_Ip2( in1_vector[0], in2[0], operator );
            minmax2 : MinMaxUnit_Ip2( in1_vector[1], in2[1], operator );
            minmax3 : MinMaxUnit_Ip2( in1_vector[2], in2[2], operator );
        DEFINE
            in1_vector[0] := in1;
            in1_vector[1] := in1;
            in1_vector[2] := in1;
            out[0] := minmax1.out;
            out[1] := minmax2.out;
            out[2] := minmax3.out;
```

-continued

```
--****MINMAX OPERATOR BLOCK FOR MIXED INPUT *** SIGNS ARE 0 : +, 1 : -***
MODULE MinMaxMixed_2( in1, in2, operator)
    VAR
        minmax1 : MinMaxUnit_Ip2( in1[0], in2_vector[0], operator );
        minmax2 : MinMaxUnit_Ip2( in1[1], in2_vector[1], operator );
        minmax3 : MinMaxUnit_Ip2( in1[2], in2_vector[2], operator );
    DEFINE
        in2_vector[0] := in2;
        in2_vector[1] := in2;
        in2_vector[2] := in2;
        out[0] := minmax1.out;
        out[1] := minmax2.out;
        out[2] := minmax3.out;
--*****SUBSYSTEM NAME :varLim***************
MODULE varLim_35(_1, _2, _3)
    VAR
        protect1 : MinMax1_Ip2(_1, _2, 0);
        _5 : MinMaxMixed_1(protect1.out, _3, 1);
        protect2 : MinMax1_Ip2(_1, _2, 1);
        VarLim_1 : MinMaxMixed_2(_5.out, protect2.out, 0);
    DEFINE
        out[0] := VarLim_1.out[0];
        out[1] := VarLim_1.out[1];
        out[2] := VarLim_1.out[2];
--*** UNIT DELAY BLOCK FOR SCALAR INPUT
MODULE UnitDelayUnit_m32767_32767 ( in1, initcondn )
    VAR
        out : -32767 .. 32767 ;
    ASSIGN
        init ( out ) := initcondn;
        next ( out ) := in1;
--********* UNIT DELAY BLOCK FOR VECTOR INPUT WITH DIMENSION 3
MODULE UnitDelay3_m32767_32767 ( in1, initcondn )
    VAR
        unitDelay1 : UnitDelayUnit_m32767_32767 ( in1[0], initcondn[0] );
        unitDelay2 : UnitDelayUnit_m32767_32767 ( in1[1], initcondn[1] );
        unitDelay3 : UnitDelayUnit_m32767_32767 ( in1[2], initcondn[2] );
    DEFINE
        out[0] := unitDelay1.out;
        out[1] := unitDelay2.out;
        out[2] := unitDelay3.out;
--********* RELATIONAL BLOCK WHERE INPUTS ARE SCALAR ******
MODULE RelationalUnit ( in1, in2, operator )
    DEFINE
        out := case
            operator = 0 : in1 = in2;
            operator = 1 : in1 != in2;
            operator = 2 : in1 < in2;
            operator = 3 : in1 <= in2;
            operator = 4 : in1 >= in2;
            operator = 5 : in1 > in2;
        esac;
--*****LOGICAL OPERATOR BLOCK FOR MIXED INPUT *****
MODULE RelationalMixed_2( in1, in2, operator)
    VAR
        relational1 : RelationalUnit( in1_vector[0], in2[0], operator );
        relational2 : RelationalUnit( in1_vector[1], in2[1], operator );
        relational3 : RelationalUnit( in1_vector[2], in2[2], operator );
    DEFINE
        in1_vector[0] := in1;
        in1_vector[1] := in1;
        in1_vector[2] := in1;
        out[0] := relational1.out;
        out[1] := relational2.out;
        out[2] := relational3.out;
--*************** LOGICAL OPERATOR BLOCK FOR 2 SCALAR INPUT
****************
** SIX CONDN ARE 0 : AND, 1 : OR, 2 : NAND, 3 : NOR, 4 : XOR, 5 : NOT **
************* FOR 'NOT' ONLY FIRST INPUT IS CONSIDERED ****************
MODULE LogicalUnit_Ip2 ( in1, in2, operator )
    DEFINE
        in1_bool := in1 != 0;
        in2_bool := in2 != 0;
        out := case
            operator = 0 : in1_bool & in2_bool ;
            operator = 1 : in1_bool | in2_bool ;
            operator = 2 : ! ( in1_bool & in2_bool );
            operator = 3 : ! ( in1_bool | in2_bool );
```

```
        operator = 4 : in1_bool xor in2_bool ;
        operator = 5 : ! in1_bool ;
     esac;
--***** LOGIC BLOCK FOR 2 VECTOR INPUT(S) EACH WITH DIMENSION 3
MODULE Logical3_Ip2 ( in1, in2, operator )
    VAR
       log1 : LogicalUnit_Ip2 ( in1[0], in2[0], operator );
       log2 : LogicalUnit_Ip2 ( in1[1], in2[1], operator );
       log3 : LogicalUnit_Ip2 ( in1[2], in2[2], operator );
    DEFINE
       out[0] := log1.out;
       out[1] := log2.out;
       out[2] := log3.out;
--*****SUBSYSTEM NAME :vectorAnd***************
MODULE vectorAnd_36(_1, _2)
    VAR
       And_1 : Logical3_Ip2(_1, _2, 0);
    DEFINE
       out[0] := And_1.out[0];
       out[1] := And_1.out[1];
       out[2] := And_1.out[2];
```

The execution semantics of Simulink is different from that of NuSMV. It is assumed that one sample time in Simulink is equivalent to one execution step (modeled by a transition from one state to another) in the NuSMV model so that the translator 100 preserves the behavior of the given Simulink model. Now, given a Simulink model along with inputs of certain types (scalar/vector of a particular dimension), there exists an equivalent NuSMV model, i.e., the set of behaviors of the Simulink model is the same as those of the NuSMV model. In other words, for a given Simulink model, the NuSMV model generated by the translator 100 varies with the input type. The main underlying reason is that Simulink accepts inputs of various types for its basic blocks (type matching and conversion is taken care of during simulation), whereas NuSMV needs type information to be specified in the code itself. For a particular basic block in Simulink, the equivalent module in NuSMV is written depending on the type of input to the block. Consequently, the NuSMV model is different for different types of input even though the underlying structure (blocks, sub-systems and their inter-connections) is the same.

NuSMV, like any other model checking tool, takes a system model and a functional requirement as inputs and determines whether the system model satisfies the functional requirement. The model checking tool of NuSMV provides a yes/no answer depending on whether the system satisfies the requirement or not. This process is defined as associating verification functional characteristics to the system model.

If the system model does not meet the specification, NuSMV model checker also outputs a system run violating the requirement. This can be used for de-bugging the system design. Since this is output in NuSMV notation, it would be useful to translate this run back into Simulink notation for playback.

Therefore, there can be provided a reverse translator 412 (FIG. 4) that takes the violating system run 410 produced by NuSMV and translates it back into a textual notation 414 involving the sub-system and block names and structure exactly as in the given Simulink model. This routine is a scripting algorithm that re-writes the violating system run 410 in NuSMV notation into Simulink notation. This reverse translator 412 also works with respect to the execution semantics mentioned in the previous section. The reverse translator is a simple algorithm that takes the violating run as provided by NuSMV and replaces certain characters in that run by those that are specific to Simulink. This process produces a run in the notation that is understandable by a Simulink user.

Certain modifications of the present invention have been discussed above. Other modifications of the present invention will occur to those practicing in the art of the present invention. For example, the translator 100 as described above receives a textual representation of a Simulink model as an input and outputs its equivalent NuSMV model. However, the translator 100 can be arranged to receive other simulation models and to translate them as models suitable for checking by other model checkers, such as SMV and SAL, whose notation is similar in structure to that of NuSMV.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

APPENDIX 1

List of basic blocks supported by the translator

Signal routing library
    Demux and mux blocks
    Switch block
    Selector block
    Multi-port switch, index vector blocks
    Merge block
Logic and bit operations library
    Relational block
    Logical block
    Interval test block
    Interval test dynamic block
    Compare to zero, compare to constant blocks
Math operations library
    Sum, add, subtract and sum of elements blocks
    Product, divide and product of elements blocks
    Abs block

APPENDIX 1-continued

List of basic blocks supported by the translator

Unary minus block
    Sign block
    Bias block
    Min-max block
    Gain block
Sources library
    Ground block
    Constant block
    In port block
    Uniform Random Number
    Step
    Counter Free Running
    Counter Limited
    Read From File
Discontinuities library
    Saturation block
    Saturation dynamic block
    Dead zone block
    Dead zone dynamic block
    Wrap to zero block
    Coulomb and vicious function block
Discrete blocks library
    Unit delay and integer delay blocks
Ports and Subsystem
    Subsystem block
Sinks blocks Library
    Out port Block

APPENDIX 2

Translator pseudo code

```
ConvertSimulinkToNuSMV( )
    Read Simulink .mdl file, extract relevant information.
    PopulateSubSystem (ParentSystem)
    if any input or output port for a block is undetermined
        make all such ports type as scalar
    WriteSubSystem(ParentSystem)
PopulateSubSystem( sub-system)
        for i ← 1 to numberOfBlocks
        do if block→type == SOURCE
            then
                for j ← 1 to block→numberOfConnectedBlocks
                    do
                        // port number -- port in connected block to which block is connected
                        // numberOfComponents - number of components of block output port
                        PopulateBlock (Connectedblock, portNumber, numberOfComponents)
    // to take care of sub-system which does not have any source block
    // of type inport
    if system != ParentSystem
        then
                        if check for any sub-system left with un-populated Source port
                then PopulateSubSystem(sub-system)
PopulateBlock(block, portNumber, numberOfComponents)
    Update input port type of block
    If output type is not computed and can be computed from this input port type or variables
of Block
        then for i ← 1 to numberOfConnectedBlocks
                do if block→type != sub-system
                    then PopulateBlock (Connectedblock, portNumber, numberOfComponents)
                    else PopulateSubSystem(sub-system)
WriteSubSystem(sub-system)
    for i ← 1 to numberOfBlocks
        do if block→type != sub-system
            then use written library to writeBlock
                write block data in current subsystem part
            else WriteSubSystem(sub-system)
```

APPENDIX 3

Pseudo code for preprocessing step for Relational operator block

```
writeRelationalBlock(int ip1, int ip2, int op, char operator[2])
    write "module __relational__operator(in1, in2)"
    // write in new line
    write "DEFINE"
    for i ← 0 to op-1
        //write in new line
        write "out[" + i + "]:= "
        if ip1 == 1
            write "in1[0]"
        else
            write "in1["+ i + "]"
        write operator
        if ip2 == 1
            write "in1[0]"
        else
            write "in1[" + i + "]"
        write ";"
```

What is claimed is:

1. A method implemented by a computer for configuring a source model for formal verification comprising:

receiving the source model as an input, wherein the source model has information about source blocks constructing the source model;

parsing each of the source blocks to select certain items of the information;

directly converting the source blocks to modules of an output model; and, using the computer, populating the modules with verification functional characteristics corresponding to the selected items of information.

2. The method of claim 1 wherein the parsing of each of the source blocks to select certain items of the information comprises discarding certain items of the information.

3. The method of claim 1, wherein the modules comprise finite state modules.

4. The method of claim 1, wherein the directly converting of the source blocks to modules of an output model comprises preserving in the output module a hierarchy of the source model.

5. The method of claim 1, wherein the output model is characterized as being verifiable by a formal verification method.

6. The method of claim 5, further comprising executing the formal verification method to verify the output model and hence the source model.

7. The method of claim 6, wherein the executing of the formal verification method comprises reporting violation of functional requirements of the output model, wherein the functional requirements are derived from the selected items of information.

8. The method of claim 7, further comprising reverse translating the reported violations into a control flow.

9. The method of claim 6, wherein the executing of the formal verification method comprises reporting compliance of functional requirements of the output model, wherein the functional requirements are derived from the selected items of information.

10. The method of claim 6, wherein the executing of the formal verification method comprises executing the formal verification method by using tools having a capability to model and verify finite state machines.

11. The method of claim 1, wherein the receiving of a source model as an input comprises receiving a Simulink model as an input.

12. The method of claim 1, wherein the directly converting of the source blocks to modules of an output model comprises directly converting the source blocks to modules of a NuSMV model.

13. The method of claim 12, further comprising executing a NuSMV model checker to verify the NuSMV model.

14. The method of claim 1, wherein the receiving of a source model as an input comprises receiving a Simulink model as an input, and wherein the directly converting of the source blocks to modules of an output model comprises directly converting the source blocks to modules of a NuSMV model.

15. The method of claim 14, further comprising executing a NuSMV model checker to verify the NuSMV model.

16. A computer readable storage medium having program code stored thereon such that the program code, when executed by a computer, performs the following functions:

receiving the Simulink model as an input, wherein the Simulink model has information about Simulink blocks constructing the Simulink model;

parsing each of the Simulink blocks to select certain items of the information including information on input and output ports of the Simulink blocks;

directly converting the Simulink blocks to NuSMV modules of an NuSMV model in accordance with the selected items of information; and, populating the NuSMV modules with verification functional characteristics corresponding to the selected items of information.

17. The computer readable storage medium of claim 16 wherein the parsing of each of the Simulink blocks comprises discarding certain other items of the information.

18. The computer readable storage medium of claim 16, wherein the directly converting of the Simulink blocks comprises preserving in the output module a hierarchy of the Simulink model.

19. The computer readable storage medium of claim 16, further comprising verifying that the NuSMV satisfies function requirements based on the information.

* * * * *